United States Patent

Flanagan et al.

[11] Patent Number: 5,815,496
[45] Date of Patent: Sep. 29, 1998

[54] CASCADE ECHO CANCELER ARRANGEMENT

[75] Inventors: Richard Thomas Flanagan, Freehold; Jean-Jacques Werner, Holmdel, both of N.J.

[73] Assignee: Lucent Technologies Inc., Murray Hill, N.J.

[21] Appl. No.: 536,905

[22] Filed: Sep. 29, 1995

[51] Int. Cl.[6] .................................................. H04B 3/23
[52] U.S. Cl. ......................... 370/287; 370/291; 371/411
[58] Field of Search .................................. 370/287, 286, 370/290, 291, 292; 379/406, 410, 411; 364/724.19, 724.2

[56] References Cited

U.S. PATENT DOCUMENTS

| | | | |
|---|---|---|---|
| 4,434,438 | 2/1984 | Rzeszewski .............................. | 358/167 |
| 4,464,545 | 8/1984 | Werner . | |
| 4,554,417 | 11/1985 | Boyer . | |
| 4,621,366 | 11/1986 | Cain et al. . | |
| 4,757,527 | 7/1988 | Beniston et al. ......................... | 370/290 |
| 5,007,046 | 4/1991 | Erving et al. . | |
| 5,131,032 | 7/1992 | Esaki et al. .............................. | 379/410 |
| 5,206,854 | 4/1993 | Betts et al. . | |
| 5,263,020 | 11/1993 | Yatsuzuka et al. . | |
| 5,428,605 | 6/1995 | André .................................... | 370/290 |

FOREIGN PATENT DOCUMENTS

| | | | |
|---|---|---|---|
| 0111938 A1 | 6/1984 | European Pat. Off. .......... | H04B 3/23 |
| 0667700 A2 | 8/1995 | European Pat. Off. . | |

OTHER PUBLICATIONS

United States Patent Application by Robert Earl Scott, entitled "Adaptive Transmit Levels for Modem Operating Over Cellular", Serial No. 08/137542 filed on Oct. 18, 1993.

United States Patent Application by David Goodwin Shaw, entitled "Multistage Echo Canceler Including Time Variation Compensation", Serial No. 08/455385 filed on May 31, 1995.

Patent No. United States Patent Application by Donald D. Duttweiler, entitled "Acoustic Echo Canceler", Serial No. 08/455377 filed on May 31, 1995.

IEEE Transactions On Communications, vol. COM–26, No. 5, May 1978, pp. 647–653, authored by Donald L. Duttweiler, entitled "A Twelve–Channel Digital Echo Canceler".

IEEE Journal On Selected Areas In Communications, vol. SAC–2, No. 2, Mar. 1984, pp. 297–303, authored by Donald L. Duttweiler, C. W. K. Gritton, Kevin D. Kolwicz and Ying G. Tao, entitled "Acascadable VLSI Echo Canceller".

ICASSP–93, 1993 IEEE International Conference on Acoustics, Speech and Signal Processing, Plenary, Special, Audio, Underwater Acoustics, VLSI, Neural Networks, vol. I of V, Apr. 27–30, 1993, Minneapolis Convention Center, Minneapolis, Minnesota, U.S.A. 93–CH3252–4.

*Primary Examiner*—Chau Nguyen
*Attorney, Agent, or Firm*—Thomas Stafford; Gregory J. Murgia

[57] ABSTRACT

The problem of tracking rapid changes in the echo signals associated with modems is eliminated by using an echo canceler consisting of cascaded adaptive filters. Each filter in the structure contributes to the modeling of the overall echo path impulse response, with a longer filter providing the ability to model long echo path impulse responses and a shorter filter providing the ability to track changes in the echo path impulse response over time.

3 Claims, 1 Drawing Sheet

CASCADE ECHO CANCELER ARRANGEMENT

CROSS REFERENCE TO RELATED APPLICATION

U.S. patent application Ser. No. 08/536,917 was filed concurrently herewith.

1. Technical Field

The present invention relates to communications systems and, more particularly, to a technique for tracking rapid changes in the echo path in communications systems that employ echo cancellation techniques.

2. Background of Invention

Echo cancelers are used for data communications so that transmission of information can occur simultaneously in both directions (called "duplex" or "full-duplex" versus "half-duplex") using the same frequency band.

The most demanding requirement for high-speed voice-band data modems is to cancel the near echo. The near echo is canceled by filtering the transmit signal by an adaptive filter (the "near canceler") to produce an estimate of the near echo which is subtracted from a received line signal.

The near canceler must estimate the near-end echo accurately enough so as to reduce its energy by approximately 60 dB. This much attenuation of the near echo (Echo Return Loss Enhancement or ERLE) typically requires a relatively long adaptive filter. The near canceler should also be able to track changes in the near echo path impulse response due to the local telephone loop or the modem's own circuitry changing characteristics due to temperature variations, etc. This requires the adaptive filter to be adapted ("trained" or "updated") initially using a training phase and also during the subsequent data transmission phase.

The least mean square (LMS) algorithm typically used to adapt the filter coefficients ("taps") introduces noise that is proportional to its adaptation step size. The larger the step size, the quicker the taps can adapt to track changes in the echo path impulse response, but also the larger the adaptation noise. Additionally, the longer, i.e., the larger the number of coefficients of, the adaptive filter being updated, the higher the noise level introduced for a given step size.

So the requirements for obtaining 60 dB ERLE and tracking changes in the echo path impulse response are conflicting requirements. The long adaptive filter and small step size used to provide the required ERLE performance will limit the ability of the filter to track relatively rapid changes in the echo path impulse response.

SUMMARY OF THE INVENTION

The problems and limitations of the prior known data echo cancelers are overcome by employing an echo canceler arrangement including a number of adaptive filters connected in cascade, i.e., in series, between transmit and receive circuit paths. A first one of the adaptive filters has a relatively long echo path impulse response synthesis capability, while an at least second one of the adaptive filters has a relatively short echo path impulse response synthesis capability. Consequently, the first one of the adaptive filters has the capability to model the echo path impulse response in order to achieve the ERLE performance criteria and the at least second adaptive filter has the capability to provide tracking of changes in the echo path impulse response.

Initially only the first long adaptive filter is trained, i.e., adapted, with the short adaptive filter impulse response being set to a nonzero response, advantageously a single center tap set to 1. Subsequently, only the short adaptive filter is trained. The short adaptive filter will modify the echo estimate provided by the first adaptive filter to track changes in the echo path impulse response. The echo estimate generated by the short adaptive filter is algebraically subtracted from the line signal being supplied to it in order to cancel any echo therein. Due to the second filter's relatively short length, the adaptation noise is reduced and a larger step size can be used to more rapidly track the changes in the echo path impulse response. This division, with the long adaptive filter used to estimate the overall echo path impulse response and the short adaptive filter used to track changes in the echo path impulse response, provides an overall system with a combination of performance characteristics that a single filter arrangement cannot attain.

This cascade echo canceler arrangement is also advantageous from an implementation complexity point of view. Typically, a data-driven echo canceler is updated during duplex operation with a relatively small step size to track slow changes in the echo path impulse response. Performance requirements may require the tap coefficients to be represented in 16-bit fixed point processors with 32 bits, or two 16-bit memory locations, per value stored as an echo canceler tap to represent the dynamic range of numbers needed to implement the LMS algorithm. Implementing the LMS algorithm on a large number of taps is also time consuming for the processor.

Due to it being a much shorter adaptive filter, updating only the short adaptive filter will reduce both the real-time requirements and the memory requirements for the modem in duplex operation. This is the mode that has the maximum requirements for real-time and for memory, so the memory and real-time reductions may directly reduce the requirements for the processor to implement the modem.

GENERAL DETAILED DESCRIPTION

Figure 1:
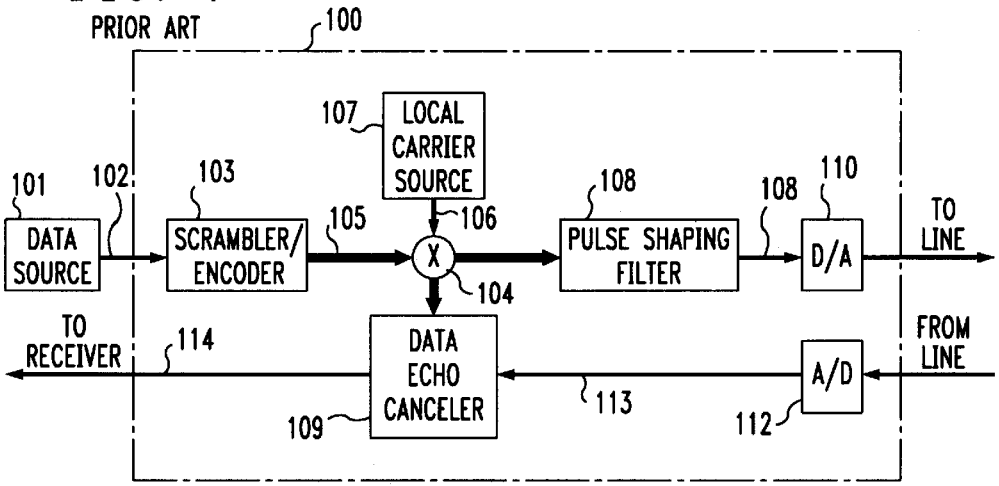
FIG. 1 shows in simplified block diagram from a prior art echo canceler arrangement in which the invention may be employed.

FIG. 1 shows in simplified block diagram form details of a prior echo canceler arrangement in which the invention may be employed. Modem 100 of FIG. 1 receives a stream of binary data from data source 101 via lead 102. Within modem 100, the binary data is scrambled and encoded in conventional fashion by scrambler/encoder 103. Once every T seconds, scrambler/encoder 103 generates a data symbol $A_m$. Symbol $A_m$ may be regarded as a complex number having real and imaginary components $a_m$ and $b_m$, respectively. T is the symbol rate, or baud, and baud index m advances at the symbol rate 1/T.

Symbol $A_m$ is extended to multiplier 104 on lead 105 where the symbol is multiplied by the complex local carrier on lead 106 generated by local carrier source 107. These so-called rotated symbols are extended to both the transmit pulse-shaping filter 108 and to data echo canceler 109. The real (single-valued) output of transmit pulse-shaping filter 108 is extended to an digital-to-analog (D/A) converter 110 on lead 111. The line signal is supplied to analog-to-digital (A/D) converter 112 and the resulting digital signal which includes an echo signal is supplied via lead 113 to echo canceler 109.

The purpose of echo canceler 109 is to model the echo path impulse response traversed by the rotated symbols emanating from multiplier 104; filtered by transmit pulse shaping filter 108; applied to D/A 110, superimposed across a telephone line interface circuit, and resampled by A/D 112; and input to echo canceler 109 via lead 113. The echo and the estimate of the echo are applied to an algebraic subtractor (not shown) and the resulting signal, which consists of the residual echo and the received line signal (if present) from the far end modem (not shown) is extended to the receiver (not shown) via lead 114.

SPECIFIC DETAILED DESCRIPTION

Figure 2:
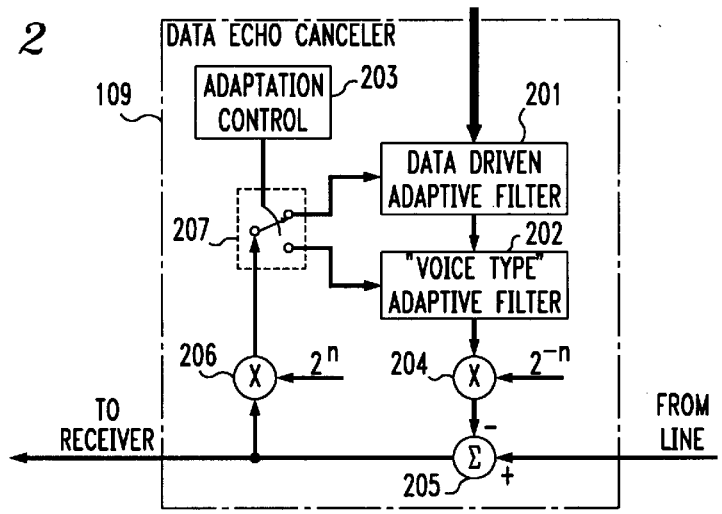
FIG. 2 shows in simplified block diagram from details of one embodiment of the invention.

FIG. 2 shows in simplified block diagram form one embodiment of the invention which may be employed for data echo canceler 109 of FIG. 1. Specifically, shown are data-driven adaptive filter 201 connected in cascade, i.e., in series, with voice-type adaptive filter 202. Adaptive filter 201 is typically of the transversal filter type described in U.S. Pat. No. 4,464,545, while adaptive filter 202 is typically of the transversal filter type described in U.S. Pat. No. 3,500,000 and also in an article by D. L. Duttweiler entitled "A Twelve-Channel Digital Echo Canceler", IEEE Transactions on Communications, VOL. COM-26, No. 5, May 1978, pages 647–653. As an illustrative example, adaptive filter 201 has 144 complex taps, i.e., coefficients, and the adaptive filter 202 has 7 real taps. It should be noted that depending on the particular application, adaptive filters 201 and 202 may have more or fewer taps. Indeed, adaptive filter 202 could have as few as one (1) real tap.

The symbol rate 1/T is 2400 baud and the tap spacing is 1/3T, equivalent to a sampling rate of 7200 Hz. Adaptive filter 201, which is a so-called "data-driven" adaptive filter, inputs data symbols at 2400 symbols/sec and generates outputs at 7200 samples/sec. Adaptive filter 202, which is a so-called "voice-type" adaptive filter, accepts outputs from the data-driven adaptive filter 201 at 7200 samples/sec and generates outputs at 7200 samples/sec. These outputs from adaptive filter 202 are scaled by multiplier 204 to produce an estimate of the echo. This echo estimate is subtracted from the line input signal via algebraic subtractor 205 to remove the echo signal. The resulting difference signal, which consists of the received line signal and the residual echo, is scaled by multiplier 206 and is then used as an error signal for adaptively updating adaptive filters 201 and 202 using the LMS update algorithm. Multipliers 204 and 206 use scaling factors, in this example $2^{-n}$ and $2^n$, respectively, whose product is 1. Therefore the step sizes used in the LMS update algorithms for both of adaptive filters 201 and 202 are independent of the scale factors used.

Adaptation control switch 207 is employed to control, via adaptation control unit 203, which of adaptive filters 201 and 202 is updated with the error signal.

Figure 3:
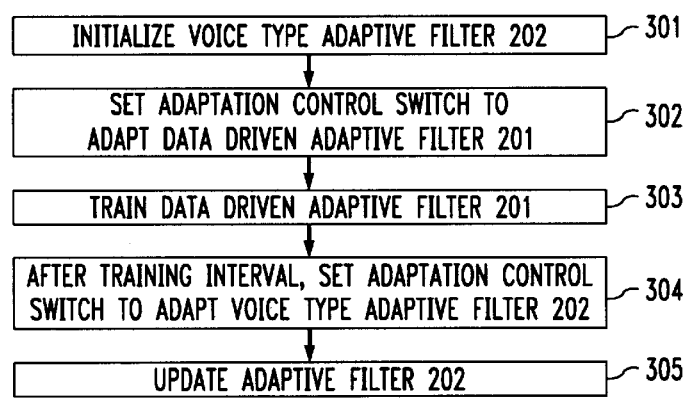
FIG. 3 is a flow chart useful in explaining the operation of the invention.

The training sequence for echo canceler 109 is shown in the flow diagram of FIG. 3 and is as follows:

1. Initialize (step 301) the taps of adaptive filter 202 to {0, 0, 0, 1, 0, 0, 0}. Note that it is required to have the taps of adaptive filter 202 be initialized to a value other than {0, 0, 0, 0, 0, 0, 0} so that the signal from the data-driven adaptive filter 201 is propagated through the adaptive filter 202. The setting of {0, 0, 0, 1, 0, 0, 0} is advantageous, as the effect of this setting is to only introduce a delay period of 1 T through adaptive filter 202, minimizing its initial impact on the training of the data-driven adaptive filter 201.

2. Adaptation control switch 207 is set via adaptation control unit 203 to adapt data-driven adaptive filter 201 (step 302).

3. Data-driven adaptive filter 201 is trained (step 303) during the normal training period allocated for echo canceler training such as specified in CCITT V.32/V.32 bis and ITU-T V.34 with the following features. First, the value used by multiplier 204 to scale the output signal from adaptive filter 202 is initialized during the training period so as to make the power of the difference signal output from echo canceler 109 be fixed within a small predetermined range. The scaler used in this example, which scales the signal by factors of 2, would fix the power within a 6 dB range. Second, the LMS algorithm used to update data-driven adaptive filter 201 must take into account the delay introduced by voice-type adaptive filter 202. In this example, the delay will be one symbol period, so that the correlation that is done in the LMS algorithm must be between the error signal and the data with the data offset by a single symbol period delay.

4. After the training period, when the modem is operating in duplex mode, adaptation control switch 207 is set via adaptation control unit 203 to adapt voice-type adaptive filter 202 (step 304).

5. Voice-type adaptive filter 202 is updated using the standard LMS algorithm (step 305). The scaling applied by scaling multiplier 204 at the output of echo canceler 202 is advantageous in that it normalizes the power of the signal input to canceler 202, effectively making the step sizes used with the LMS algorithm to update adaptive filters 201 and 202 independent of the power of the echo signal.

Note that during step 3 the taps of adaptive filter 202 are not updated using the LMS algorithm, and during step 5 the taps of data-driven adaptive filter 201 are not updated.

We claim:

1. An echo canceler arrangement comprising:

a first adaptive filter having a relatively long echo path impulse response synthesis capability;

an at least second adaptive filter connected in series with said first adaptive filter and having a relatively short echo path impulse response synthesis capability as compared to the echo path impulse response synthesis capability of said first adaptive filter, an output from said second adaptive filter being an estimate of any echo in a received line signal, said at least second adaptive filter including at least one tap coefficient, wherein said at least one tap coefficient is initially set to a predetermined value;

means for algebraically subtracting said echo estimate from said received line signal; and means for controlling the adaptation of said first and second adaptive filters, wherein said first adaptive filter is controlled by said means for controlling to adapt during a predetermined initial training interval, and wherein after said initial training interval said first adaptive filter is inhibited by said means for controlling from further adaptation.

2. The echo canceler arrangement as defined in claim 1, wherein said means for controlling controls said second adaptive filter so that it is allowed to adapt after said initial training interval has been terminated.

3. The echo canceler arrangement as defined in claim 2 wherein said first adaptive filter has a plurality of tap coefficients larger in number than the number of tap coefficients of said second adaptive filter.

* * * * *